United States Patent [19]

Viswanathan

[11] 3,753,007

[45] Aug. 14, 1973

[54] STROBE GENERATION SYSTEM

[75] Inventor: G. R. Viswanathan, Saint Troy, N.Y.

[73] Assignee: Honeywell Information Systems Inc., Waltham, Mass.

[22] Filed: Nov. 16, 1970

[21] Appl. No.: 89,914

[52] U.S. Cl. .......... 307/247 A, 178/17 C, 307/260, 328/110, 328/162, 340/365

[51] Int. Cl. .......... H04b 15/00, H041 15/06

[58] Field of Search .......... 340/365; 178/17 R, 178/17 S, 17 A, 17 C, 17 D, 81; 307/233, 234, 247 A, 268, 243, 265; 328/61, 63, 104, 119, 110, 162, 165

[56] References Cited

UNITED STATES PATENTS

| | | | |
|---|---|---|---|
| 3,623,082 | 11/1971 | Stein et al. | 340/365 S |
| 3,631,473 | 12/1971 | Yakata et al. | 340/365 E |
| 3,576,569 | 4/1971 | Watson | 340/365 X |
| 2,989,729 | 6/1961 | Schafer | 340/365 |
| 3,232,404 | 2/1966 | Jones, Jr. | 340/365 X |
| 3,239,608 | 3/1966 | Jones, Jr. | 178/17 R X |
| 3,457,368 | 7/1969 | Houcke | 178/17 R |
| 3,483,553 | 12/1969 | Blankenbaker | 178/17 R X |
| 3,466,647 | 9/1969 | Guzak, Jr. | 178/17 R X |
| 3,562,765 | 2/1971 | Marino | 178/17 R X |

OTHER PUBLICATIONS

Millman & Taub, Pulse, Digital and Switching Waveforms, pgs. 317 & 325; McGraw-Hill Book Co., 1965.

Lewis, "A Delay Circuit with Monostable & Bistable Properties," Electronic Engineering (Publication), pgs. 84–87; 6/1970.

*Primary Examiner*—John W. Huckert
*Assistant Examiner*—L. N. Anagnos
*Attorney*—Ronald T. Reiling and Fred Jacob

[57] ABSTRACT

A strobe generator in response to a key depression generates a strobe which is not affected by contact bounce produced by depressing and releasing keys whereby the strobe signals when a utilization device may sample valid keyboard generated information. An accurate strobe interval is generated by utilizing a retriggerable logic circuit to produce a strobe only after contact bounce produced by depressing a key subsides. The width of the strobe is arranged to be a function of the length of time the key is depressed. Therefore, the strobe may be used to reset special keyboard control functions within the device conditioned by previous keyboard entries. Additionally, the strobe generator also includes logic for sensing multiple key depressions to condition the generation so that it does not generate a strobe for invalid key generated information thereby eliminating signaling unnecessary error indications to the operator.

19 Claims, 5 Drawing Figures

PATENTED AUG 14 1973 3,753,007

SHEET 1 OF 3

INVENTOR
G. R. VISWANATHAN

BY *Faith F. Driscoll*

ATTORNEY

INVENTOR
G. R. VISWANATHAN

BY

Faith F. Driscoll
ATTORNEY

INVENTOR
G. R. VISWANATHAN
BY
Faith F. Driscoll
ATTORNEY

STROBE GENERATION SYSTEM

BACKGROUND OF THE INVENTION

1. Field of Use

This invention relates to data entry systems and more particularly to strobe generators for use with electronic keyboard input systems.

2. Discussion of Prior Art

In general, keyboard encoding systems in order to be reliable normally provide means for eliminating the adverse affects of switch contact bounce and the adverse effects of multiple key depressions. In order to eliminate contact bounce, a number of prior art systems have employed RC networks on switch contacts. Some other prior art systems use a strobe contact and intentionally delay the output signal to eliminate any false signals because of contact bounce.

While these systems tend to reduce the effects of contact bounce, they have not been found to fully or reliably eliminate them. For example, a fixed delay of the strobe contact signal may not be effective where contact bounce produced by key depressions endures for long periods of time. Further, when the fixed delay is increased, the same system may not respond properly to overcome the effects of contact bounce produced by key releasing. Additionally, because the strobe signal normally has a fixed width, and is generated independently of key release, it cannot be used to reset previous keyboard generated editing functions.

As concerns the effects of multiple key depression or overlap in key depression, prior art systems generally provide means for physically interlocking the keyboard when the overlap occurs. In other instances, the prior art provides appropriate error signals. These systems have been found to interfere with operator speed resulting in decreased efficiency.

OBJECTS AND SUMMARY OF THE INVENTION

Accordingly, it is a general object of this invention to provide an improved keyboard entry system which includes a strobe generator for enabling a device to sample keyboard generated information only when the information is valid.

It is a further object of this invention to provide strobe generator logic which automatically signals when multiple key depression occurs thereby preventing the system from sampling erroneously generated information and providing unnecessary error indications to an operator.

It is a specific object of this invention to provide a strobe generator circuit which generates a strobe signal which is not affected by contact bounce produced by both key depression and key release.

It is a more specific object of this invention to provide a strobe generator which generates a strobe signal only after contact bounce produced by key depression subsides.

It is still a more specific object of this invention to provide a strobe generator which generates a strobe signal whose width is a function of the length of time a key is depressed whereby the strobe signal may be used to reset special keyboard functions set by previous keyboard entries.

The above and other objects are provided according to the basic concept of the invention through a strobe generator which in accordance with a key selection provides an output strobe designating a time period when valid information may be sampled. In a preferred embodiment, the strobe generator includes a bounce eliminator circuit responsive to key depressions to retrigger from signal transitions produced from contact bounce until such transitions subside for a predetermined period whereafter it produces the desired output. This output is, then combined with the keyboard generated information signals to produce the output strobe designating a time period when valid information may be sampled by the system. The generator terminates the strobe signal upon release of the same key. Accordingly, the strobe signal is unaffected by contact bounce produced by key depression and key release.

Because the strobe signal endures until the key is released, it can be used to reset functions initiated from the keyboard. For example, when an operator wishes to repeat the transmission of an information character represented by an associated keyboard key, the operator depresses such a key for a period of time that is required to transmit the number of desired repetitions. This transmission is first initiated when the operator depresses a control key (i.e., a repeat key) which conditions logic means within the keyboard system for thereafter repeating the information character corresponding to the subsequently selected key. When the operator releases this key, the trailing edge of the strobe signal is used to reset the previously conditioned logic means thereby restoring the system to its original status.

The strobe generator of the illustrated embodiment also includes a multiple key sensor which produces an output signal in the event of a multiple key depression. The output of the multiple key sensor is then combined with the output of the bounce eliminator circuit to prevent the strobe generator from generating a strobe signal indicating a time period when valid information may be sampled. When the operator releases the key or keys, the strobe generator will then produce an output strobe. This arrangement eliminates the need for having the system generate unnecessary error indications to the operator.

The multiple sensor output is also coupled as a triggering input to the bounce eliminator circuit so that the strobe generator is able to reliably prevent the generation of a strobe signal notwithstanding contact bounce produced by key depression and key release.

The above and other objects of the present invention are achieved in an illustrative embodiment described hereinafter. The novel features which are believed to be characteristic of the invention, both as to its organization and method of operation, together with further objects and advantages thereof will be better understood from the following description considered in connection with the accompanying drawings. It is to be expressly understood, however, that each of the drawings are for the purpose of illustration and description only and are not intended as a definition of the limits of the invention.

DESCRIPTION OF THE ILLUSTRATIVE EMBODIMENT

Figure 1:
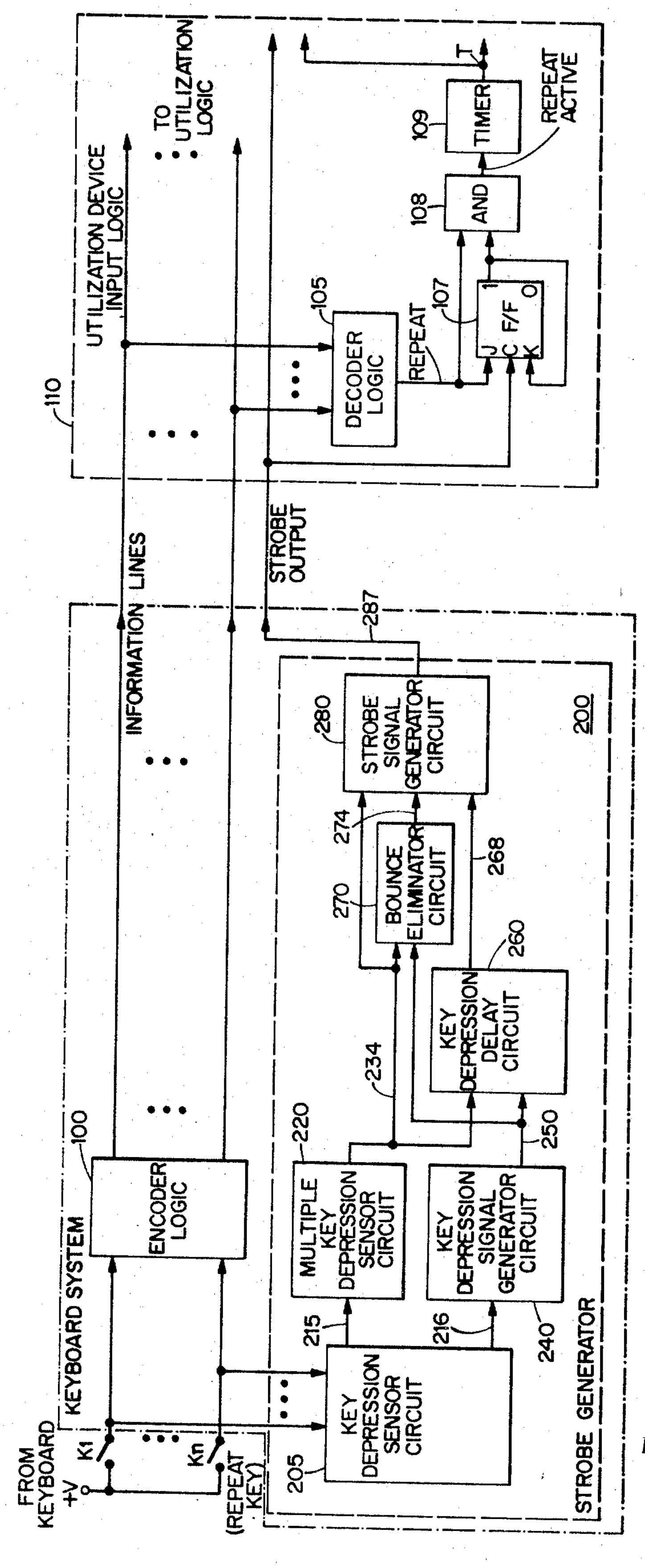
FIG. 1 is a block diagram of a keyboard input system which incorporates the present invention.

FIG. 1 shows in block diagram form, a keyboard input system which includes a number of keyboard switches K1 through Kn mounted on a keyboard (not shown) which feed an encoder logic 100, conventional in design, and a strobe generator 200. The output information lines from the encoder logic 100 and strobe line of the generator 200 are applied as inputs to an utilization devide input logic 110.

The keyboard input system can be used with any arrangement of keys or push-buttons and these keys may be positioned physically in any orientation. The encoder logic 100 is typically a code translation network of conventional design which may take the form of encoders disclosed in a text entitled "Aritmetic Operations in Digital Computers" by R. K. Richards, D. Van Nostrand Company, Inc. Copyright 1955. Alternatively, the encoding may be accomplished by selective wiring such as that shown in an article entitled "New Switch Display Matrix System," Computer Design, March 1965.

The output of the encoder logic 100 feeds a decoder logic 105, also conventional in design, included within the utilization device input logic 110, which receives the keyboard generated information characters. In a typical system, the information lines may be coded in ASCII code. The decoder logic 105 is constructed to recognize information characters characterized by special codes. One such information character it recognizes is a character coded to designate a repeat operation.

The output of the decoder logic 105 feeds control logic, which simply may take the form of a bistable storage device such as a JK flip-flop 107. In this arrangement, the leading edge of the strobe signal would be used to sample the code applied to the INFORMATION LINES.

Also, the presence of a signal level representative of a binary ONE at the output of the decoder 105 together with trailing edge of the strobe would set the REPEAT flip-flop 107 to its one state. When set, this device would condition logic in the form of a REPEAT ACTIVE AND gate 108 and a timer 109 (e.g., counter) for transmitting the information character code of a subsequent selected key at a desired rate, T, until that key is released. At that time, the trailing edge of the strobe resets REPEAT flip-flop 107.

As mentioned above, the switches K*l* through K*n* feed the strobe generator 200. The strobe generator includes a key depression sensor circuit 205 whose outputs 215 and 216 respectively feed a multiple key depression sensor circuit 220 and a key depression signal generator circuit 240.

The key depression sensor circuit (KDSC) in response to a depression of one or more keys, generates appropriate output signal levels on lines 215 and 216. The multiple key depression sensor circuit (MKDSC) in response to the signal level appearing on line 215 generates a signal level for the depression of more than one key. Similarly, the key depression signal generator (KDSGC) generates an output signal level in response to each key depression.

Both the multiple key depression sensor circuit 220 and key depression signal generator circuit 240 apply their outputs along lines 234 and 250 to a bounce eliminator circuit 270. The output signal levels applied to lines 234 and 250 serve as triggering inputs to the bounce eliminator circuit 270.

In the illustrative embodiment, the bounce eliminator circuit comprises a DC level sensitive retriggerable monostable multivibrator. This circuit provides an output pulse whose duration and accuracy is a function of external timing components only. The successive inputs with a period shorter than the delay time established by external components, retrigger the circuit and result in a continuous true output (i.e., representative of a binary ONE). Where the retrigger pulse does not come within a predetermined time period after the initial trigger pulse, the circuit switches after a predetermined time period state producing a binary ZERO output.

A number of well-known circuits may be used to provide this mode of operation. For example, this circuit may take the form of either the resettable circuit described in U.S. Pat. No. 3,146,430 assigned to the assignee named herein or the retriggerable monostable multivibrator described in a publication entitled "9601 Retriggerable Monostable Multivibrator" published by Fairchild Semiconductor Corporation, dated Sept. 1968.

The output levels generated by the multiple key depression circuit 220 and key depression signal generator circuit 240 are additionally applied as inputs to a key depression delay circuit 260. This circuit delays the key depression signal levels produced by circuits 220 and 240 and then applies them along line 268 to a strobe signal generator circuit 280.

The strobe signal generator circuit 280 in response to the signal levels applied to lines 268, 274, and 234, generates a strobe signal on line 287 which indicates a period of time when valid data may be sampled.

DESCRIPTION OF FIG. 2

Figure 2:
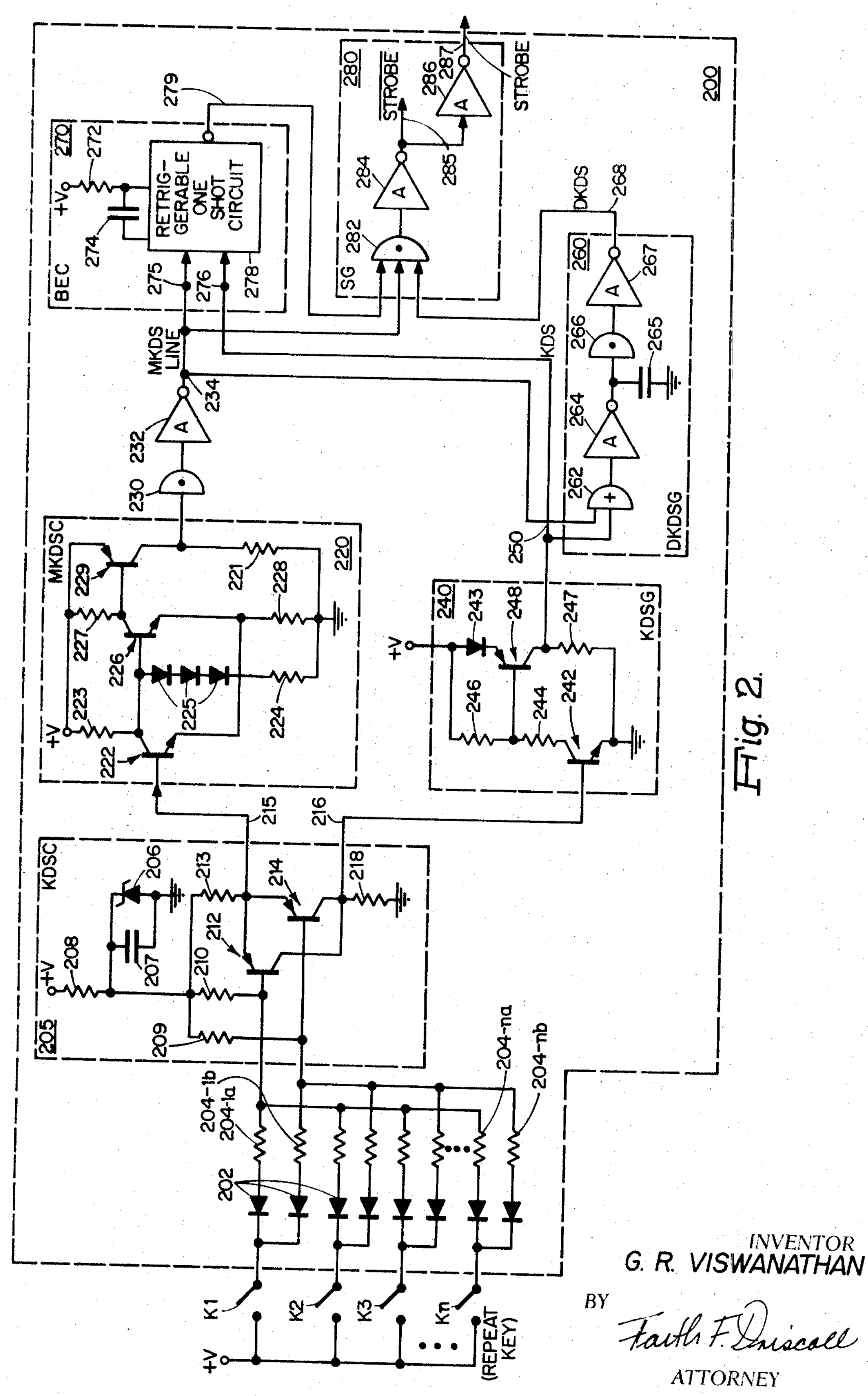
FIG. 2 shows in detail the strobe generator of FIG. 1.

FIG. 2 shows details of the pertinent portions of the strobe generator 200. As shown, the switches *Kl* through *Kn* are coupled as separate inputs through series connected diode and resistors 202 and 204 to the base electrodes of a pair of transistors 212 and 214 connected to function as an emitter follower OR gate.

More specifically, the emitter electrodes of transistors 212 and 214 connect in series to a supply voltage, +*V*, through resistors 208 and 213. As shown, resistor 208 has one of its ends connected to a zener diode 206 in parallel with a capacitor 207. The zener diode and capacitor 206 and 207 respectively establish a constant bias voltage level. This level in addition to being applied to resistor 213 to the emitter electrodes of transistors 212 and 214 is also applied through resistors 209 and 210 respectively to the base electrodes of transistors 212 and 214. The collector electrodes of these transistors are connected in common to a resistor 218 to ground.

The output level appearing at the common emitter electrode junction is applied along line 215 to the base electrode of an input transistor 222 of a threshold switching circuit further comprising a transistor 226. The output of this circuit is directly coupled to a transistor switching circuit 229. This circuit converts the voltage level it receives to a logic voltage level.

As shown, these transistors are connected to form a conventional Schmitt trigger circuit. Normally, transistor 222 conducts and current flows from supply voltage, $+V$, through collector resistor 223 through the collector to emitter electrode path of transistor 222 through emitter resistor 228 to ground. The current flowing through collector resistor, series diodes 225 and resistor 224 establishes a voltage level which is sufficient to hold transistor 226 nonconductive. Accordingly, a positive voltage level is applied through collector resistor 227 to the base electrode of switching transistor 229. This positive voltage level is the same in magnitude as that applied to the emitter electrode and thus biases transistor 229 off. Accordingly, the circuit 220 applies a zero voltage level corresponding to a binary ZERO to an AND gate 230 which is amplified and inverted by amplifier 232. The inversion function performed by amplifier 232 and others described herein is indicated by a circle at the output of the amplifier block.

Alternatively, when the output level applied by circuit 205 goes below the threshold voltage established by the network including resistors 223, 224 and diodes 225, transistor 222 is switched off which in turn causes transistor 226 to be switched on. When transistor 226 becomes conductive, it switches transistor 229 into conduction which applies a voltage level representative of a binary ONE to AND gate 230. This level is inverted by amplifier 232 which applies a voltage level representative of a binary ZERO to line 234.

The voltage level appearing at the common collector electrode junction of the emitter follower OR gate 212, 214 is applied along line 216 to the base electrode of an input transistor 242 of the key depression signal generator circuit 240. This circuit comprises a pair of complementary transistors 242 and 248. More specifically, the circuit includes an npn transistor 242 connected in a common emitter configuration with its output connected to the base electrode of a pnp transistor 248 connected in a grounded collector configuration. These pair of transistors function as a level shifting circuit which in response to one or more keys converts the voltage level applied to line 216 by emitter follower OR gate into a logic level.

In the absence of an input signal level to the base electrode of transistor 242, transistors 242 and 248 are biased by supply voltage, $+V$, to be nonconductive. However, when either transistor 212 or 214 conduct, they supply current to the base electrode of transistor 242 thereby rendering it conductive. When conductive, transistor 242 turns on transistor 248. Current flows from supply voltage, $+V$, through a diode 243 through the emitter to collector electrode path of transistor 248 through collector resistor 247. The current flowing through collector resistor 247 produces a positive voltage level which is applied along line 250 to circuits 260 and 270.

As mentioned previously, circuit 260 delays any signal level applied to the inputs of its OR gate 262. This delaying action is accomplished by a pair of series connected inverter amplifiers 264 and 267 which connect in common to a capacitor 265 through an AND gate 266. The capacitor 265 eliminates transistions occurring within the retriggering period of the bounce eliminator circuit 270.

As mentioned previously, the bounce eliminator circuit which comprises the retriggerable one shot circuit 270 has a pair of separate trigger inputs 275 and 276. The retrigger pulse width of this circuit is established by external resistive and capacitive elements 272 and 274 respectively which connect to the positive supply voltage, $+V$. The output pulse width PW for this circuit is defined in accordance with the following equation:

$$PW = .32RC[1 + .7/R]$$

for $C$ greater than $10^8$ picofarads, where $R$ is value of resistor 272 in kilohms, $C$ is the value of capacitor 274 in picofarads and $PW$ is in nanoseconds. In the illustrated embodiment, the output pulse width is 3 milliseconds. This means that this circuit will eliminate transitions produced by key bounce which occur within 3 milliseconds of each other. Normally, these transitions occur within 500 nanoseconds of each other. Since an operator normally enters information at much longer intervals, the circuit maintains high operator efficiency.

The inverted or complemented output of the one shot circuit 278 is applied along line 274 to an AND gate 282 included within the strobe generator circuit 280. Again, the circle at the output is used to indicate that the inversion or complement of output of circuit 270 is applied to line 274.

The strobe generator circuit is operative to "AND" the outputs of the bounce eliminator circuit, the multiple key depression sense circuit, and the delayed key depression circuit. The ANDed output developed by AND gate 282 is amplified and inverted by series amplifiers 284 and 286. The amplified version of the output of AND gate 282 corresponds to the strobe appearing on line 287. This signal when present indicates the only time period during which valid information generated from a keyboard selection may be sampled by the utilization device logic 110. The utilization device can take numerous forms. For example it may comprise a data processing unit, a CRT display device, or, more simply, a data buffer register which is allowed to receive the keyboard generated characters only upon receipt of a strobe signal from line 287.

DESCRIPTION OF OPERATION OF THE PREFERRED EMBODIMENT

Figure 3C:
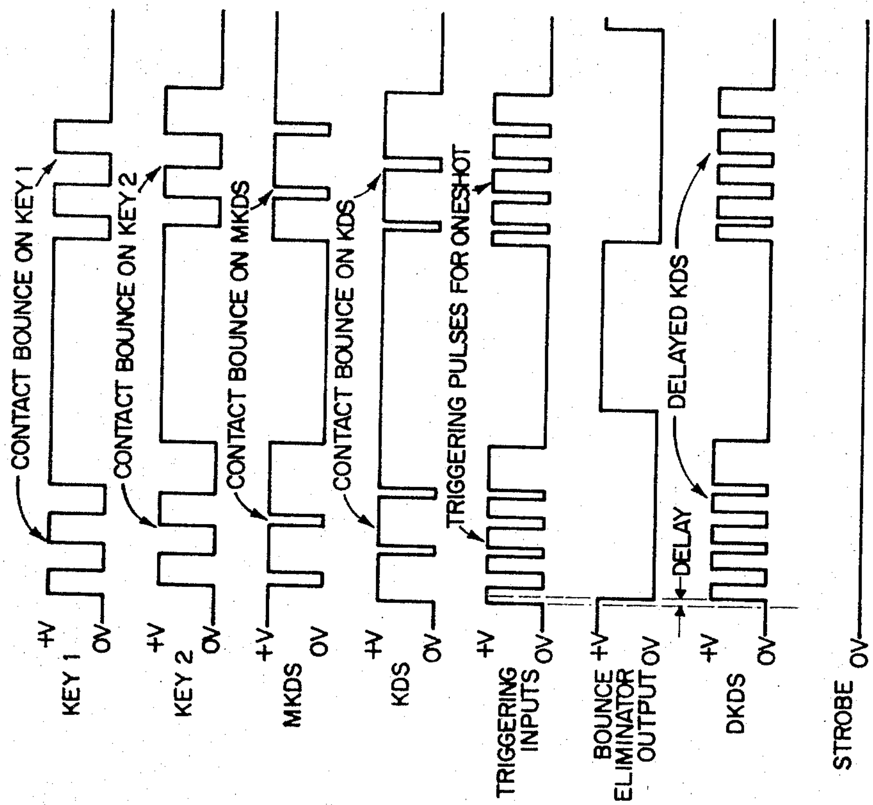
FIGS. 3*a*–3*c* show three sets of waveforms used to illustrate the operation of the illustrative embodiment of the invention.
Figure 3A:
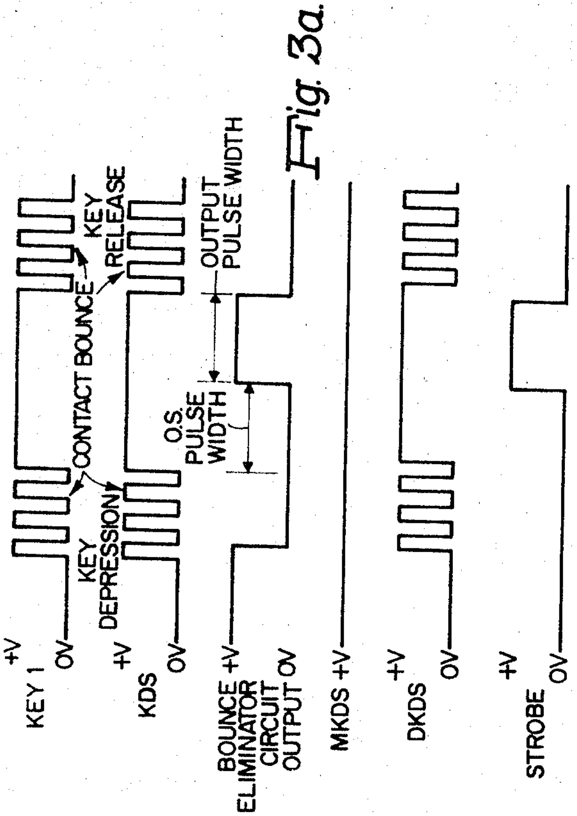

Referring now to FIGS. 1, 2, 3*a*, 3*b*, and 3*c*, the operation of the strobe generator 200 will now be described. FIG. 3*a* shows representative waveforms which will be generated by the various portions of the strobe generator 200 when an operator depresses a single key. The waveform KEY1 of FIG. 3*a* represents the contact bounce created when an operator depresses and releases a single key.

Assuming that the operator depresses a key associated with switch K*l*, the transistions created by contact bounce forward bias diodes 202*a* and 202*b*. This voltage is in turn applied to the base electrodes of transistors 212 and 214 respectively. Both transistors which connect as an emitter follower OR gate conduct in turn producing a positive voltage level on line 216 which is applied to the base electrode of transistor 242. Simultaneously therewith, the voltage developed at the common emitter junction is applied along line 215 to the base electrode of transistor 222. With a single key depression, the positive voltage level applied to the base electrode of transistor 222 will be higher than the threshold voltage present at the emitter electrode of the same transistor. Therefore, transistor 222 remains conductive which renders transistor 226 nonconductive. Accordingly, transistor 229 remains nonconductive which in turn applies a voltage level representative of a binary ZERO to AND gate 230. This voltage is inverted by amplifier 232 and the signal level MKDS is at a positive voltage level representative of a binary ONE as illustrated in FIG. 3a.

The waveform KDS appearing on line 250 causes retriggerable one shot circuit 278 to become active. That is, the circuit 278 is retriggered upon each leading edge transition (i.e., positive going transition) produced by the contact bounce corresponding to key depression, since these transitions occur within a time period which is less than the one shot circuit pulse width. This action is illustrated by the bounce eliminator circuit output waveform of FIG. 3*a*. When the transitions subside for a time period corresponding to the pulse width, one shot circuit 278 switches state and then in response to a leading edge transition produced by key release switches its state again. This action produces a waveform the complement of which corresponds to the bounce eliminator circuit output of FIG. 3*a*. Because circuit 278 switches state again upon key release, it is free of transitions caused from subsequent contact bounce.

Since it takes the one shot circuit 278 a small amount of time to respond to a first transition, the bounce eliminator circuit output waveform is indicated as being delayed in time with respect to the waveform KDS.

Additionally, the waveform KDS is applied to OR gate 262 of delay key depression sense generator 260. Circuit 260 delays waveform KDS so that the first transition of waveform KDS corresponds to the initial switching of retriggerable one shot circuit 278.

The bounce eliminator circuit output waveform, waveform MKDS, together with delayed waveform DKDS are ANDed by AND gate 282 to produce the strobe waveform of FIG. 3*a*. This waveform appears on line 287. By ANDing these waveforms, the strobe generator produces a single STROBE waveform whose trailing edge coincides with the transition produced by key release. Therefore, the trailing edge of the strobe waveform may be used to reset logic functions within the keyboard system set by previous keyboard entries. For example, when the operator depresses a repeat key, the decoder logic 105 will be operative to decode this special coded information character and produce a signal at its output.

As illustrated, it may be desirable to set the above mentioned special functions by combining the output produced by decoder logic 105 with the strobe waveform as shown. Thus, these functions are sampled by the bounce free strobe and are generated without contact bounce. This also permits conditioning of these various functions to occur at the appropriate time period (e.g., in accordance with key selections). For example, in a repeat operation, the information character produced by a next key selection will be repeated until the operator releases that key. Since the trailing edge of the strobe waveform coincides with a key release, the strobe waveform may be used to reset the previously set repeat function as mentioned previously.

It will be appreciated by those skilled in the art that the strobe waveform may be used to return other keyboard initiated functions to their original status.

Figure 3B:
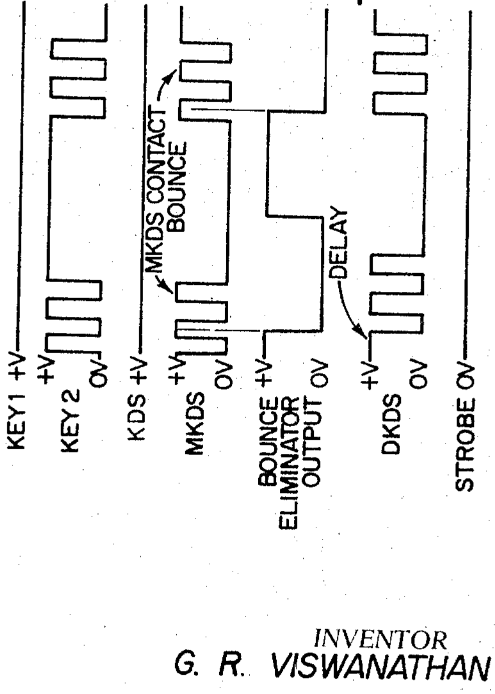

The set of waveforms shown in FIGS. 3*b* and 3*c* illustrate the signal levels generated when more than one key is depressed at a time. The waveforms of FIG. 3*b* occur when a first key is depressed and a second key is depressed much later and then released much earlier than the first key. Therefore, the waveform KDS appears high illustrating that the first key is closed for a longer period of time. By contrast, the second key is closed for a relatively short period of time and produces the leading edge and trailing edge contact bounce characteristics of waveform MKDS.

Referring to FIG. 2, it is seen that when more than one key is depressed at a time, as for example, keys corresponding to switches K1 and K2, then the resistors 204–1*a*,2*a* and 204–1*b*, 2*b* of both keys are placed in parallel. The parallel combination of these resistors causes a decrease in the value of positive voltage applied to the base electrode of transistors 212 and 214. Accordingly, the transistors of the emitter follower OR gate conduct harder which in turn decreases the level of positive voltage applied to line 215.

The decrease in positive voltage to the base electrode of transistor 222, causes it to become nonconductive. When transistor 222 becomes nonconductive, it increases the value of positive voltage applied to the base electrode of transistor 226. Accordingly, transistor 226 is switched into conduction which in turn switches transistor 229 into conduction. Transistor 229 when conductive causes a positive voltage level representative of a binary ONE to be applied to AND gate 230. The amplifier 232 inverts this voltage level and produces the waveform MKDS of FIG. 3*b*.

The waveform MKDS together with the waveform KDS is applied to OR gate 262 and thereafter delayed by circuit 260 producing waveform DKDS of FIG. 3*b*. At the same time, each of the waveforms MKDS and KDS are applied as individual triggering inputs to the one shot circuit 278. This circuit in response to the transitions of waveform MKDS retrigger until its pulse width is exceeded whereby it produces the bounce eliminator circuit output of FIG. 3*b*.

As mentioned previously, waveforms MKDS, DKDS together with the bounce eliminator output waveform are ANDed to produce the strobe waveform of FIG. 3*b*. It will be noted that the waveform MKDS is at a zero volts level representative of a binary ZERO, which when delayed produces waveform DKDS which is also at a zero volts. Accordingly, when these waveforms are ANDed with the bounce eliminator output waveform, AND gate 282 is forced to zero volts level by waveform DKDS. Thus, the occurrence of a multiple key depression causes the strobe waveform applied to line 287 to remain at a zero volts level. This signals the utilization device logic 110 that there is no time period at which valid keyboard information produced by the second key may be sampled. The generator 200 will not produce an output STROBE for the second key until the operator releases the first key. This arrangement eliminates the need for having the system signal the operator of an data error. Hence, the operator can continue typing at a high rate without being interrupted by unnecessary error conditions.

FIG. 3*c* illustrates the waveforms produced when two keys (i.e., keys 1 and 2) are depressed simultaneously in turn producing contact bounce during key depression and key release. Each of the waveforms produced by key 1 and key 2 are applied to the base electrodes of transistors 212 and 214 of the emitter follower OR gate 205. The "ORed" output is in turn applied to the depression sense generator circuit 240 which is operative to produce waveform KDS.

The other output of circuit 205 when applied to the base electrode of transistor 222 causes the multiple key depression sense circuit 220 to produce waveform MKDS of FIG. 3*c*. This circuit operates in a manner similar to that previously described, thereby producing a signal which indicates the occurrence of a multiple key depression.

Both the waveforms MKDS and KDS are applied as triggering inputs to the resettable one shot circuit 278. In the manner previously described, the one shot circuit 278 retriggers until the transitions produced by the contact bounce of both keys 1 and 2 has subsided for a predetermined time period whereafter it produces the output bounce eliminator waveform shown in FIG. 3*c*.

The triggering input waveform of FIG. 3*c* which represents the ORing of waveforms MKDS and KDS, is also applied as an input to the delay circuit 260. The delay circuit produces the waveform DKDS of FIG 3*c*. The strobe generator circuit 288 is operative to AND waveforms MKDS, and DKDS with the bounce eliminator output waveform thereby producing the strobe waveform of FIG. 3*c*. Since a multiple key depression has occurred, the strobe waveform remains again at zero volts indicating that there is no period during which valid keyboard generated information may be sampled.

By way of illustration only, a system according to the invention operated successfully with the component values listed in the table.

TABLE

| Resistors: | Kilohms |
|---|---|
| **204-1***a*,**1***b* through **204-N***a*, N*b* | 3.0 |
| **208** | 0.12 |
| **209,210,227** | 2.2 |
| **213** | 1.0 |
| **218, 246** | 4.7 |
| **221** | 0.470 |
| **223** | 0.330 |
| **224** | 0.150 |
| **228** | 3.3 |
| **244** | 2.2 |
| **247** | 0.220 |
| **272** | 39 |

Capacitors:

| | Microfarads |
|---|---|
| **207** | 0.1 |
| **265** | $33{:}10^{-6}$ |
| **274** | 0.47 |

| Voltage Source: | Volts |
|---|---|
| +V | 5.0 |

These values are only illustrative and should not be construed in any way as limiting with respect to the present invention.

The foregoing description has disclosed a strobe generator which is operative to generate a strobe in response to a key selection indicating a period during which only valid keyboard generated information may be sampled. This is notwithstanding those produced by contact bounce and invalid information produced by other multiple key depressions or overlap in key depressions. Accordingly, the arrangement eliminates signaling unnecessary error indications (e.g., multiple key depressions) to the operator. Further, the above arrangement permits an operator to depress a new key immediately after the last key is released since any bounce produced by key depression and key release is eliminated by the above arrangement. Therefor, this system provides excellent "crossover" characteristics which may be defined as the time interval between which a new key can be depressed after the last key is released. In the system of the present invention, the minimum time between key closures is less than 200 nanoseconds (i.e., only circuit delays). Thus, the chance of simultaneously depressing two keys to introduce an error has been eliminated essentially.

It will be appreciated by those skilled in the art that many changes may be made to the illustrative embodiment without departing from the spirit and scope of the invention. For example, although certain circuits have been disclosed herein, circuits which perform similar functions may be also substituted herein. Further, the invention may be used in combination with other types of data entry systems.

While in accordance with the provisions and statutes, there has been illustrated and described the best form of the invention known, certain changes may be made in the circuits and system described without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. A strobe generator for generating an strobe signal indicating a period to a utilization device when valid keyboard generated information may be sampled, said strobe generator comprising:

sensing means for generating a first signal in response to said keyboard generated information;

bounce eliminator means coupled to said sensing means, said bounce eliminator means being arranged to produce an output signal in response to said first signal only after key depression bounce subsides and which terminates upon key release; and, strobe logic gating means coupled to said bounce eliminator means and to said sensing means, said gating means being responsive to said first signal and to said output signal to produce said strobe signal which defines a period of time when said keyboard generated information can be sampled without said information being affected by contact bounce produced by key depression and key release.

2. A strobe generator for use in a keyboard entry system comprising a plurality of depressable keys, each key being arranged to close a set of contacts when depressed to produce a switching signal and an encoding network for generating an encoded information output at a set of output lines in response to each key selection, said strobe generator comprising:

key depression sensing means being connected to each of said contacts for generating a first signal in response to said switching signal produced by a key selection;

retriggerable bounce eliminator circuit means coupled to said sensing means for producing a bounce free output signal in response to said first signal a predetermined period of time after any noise transitions produced by said key depression subsides and which endures until key release; and, strobe AND logic gating means coupled to receive said bounce free output signal and said first signal, respectively from said bounce eliminator circuit means and said key depression sensing means and being conditioned thereby to produce a strobe output signal which endures until said key release to define a time period when the information output at said output lines produced by said key selection is valid for sampling.

3. The strobe generator of claim 2 wherein said key depression sensing means further includes means for generating a second signal having at least first and second voltage levels respectively in response to single and multiple key depressions; and, multiple key depression sensing means coupled to said key depression sensing means and to said strobe AND logic gating means, said multiple sensing means being switched only in response to said second level to produce an output signal for inhibiting said strobe AND logic gating means from generating said strobe output signal.

4. A strobe generator for generating an output strobe signal indicating a time interval to a utilization device when keyboard generated information subject to contact bounce produced from key depression and key release may be sampled, said strobe generator comprising:

key depression sensing means, KDS, for generating a signal in response to said key generated information;

bounce eliminator circuit means, BEC, coupled to said sensing means, KDS, for producing a bounce free output waveform in response to said signal only after said key depression bounce subsides and which terminates upon key release; and, strobe logic gating means, SG, coupled to said sensing means KDS and to said bounce circuit means, BEC, for combining logically said output waveform and said signal to produce said output strobe signal which defines a period of time wherein said key generated information sampled is valid.

5. The generator of claim 4 wherein said sensing means KDS further includes means for generating an output in response to multiple key depressions; and, threshold switching means, MKDS, coupled to said sensing means KDS responsive to said output to generate a logic output MKDS for conditioning said strobe logic gating means SG to inhibit said output strobe signal for the key depressed last whereby said key generated information of said last depressed key is sampled only in the presence of a single key depression.

6. In a keyboard system including a strobe generator for generating a strobe signal indicating when valid information generated from selecting one or more keys may be sampled and for resetting functions set by previous key selections, said strobe generator comprising:

first means for generating a first signal in response to each of said key selections;

said means coupled to said first means and being operative to produce a bounce free output signal in response to said first signal only after key depression bounce subsides and which terminates upon key release; and, third means coupled to said first and second means, said third means being operative to combine logically said first signal and said output signal so as to produce said strobe signal in accordance with said key selection whereby said strobe signal defines a time interval when only valid information from said key selection may be sampled.

7. The system of claim 6 wherein said second means includes a retriggerable circuit, said circuit being adapted in response to each of the transitions produced by said key selection to switch to a first state and thereafter automatically switching to a second state after a predetermined time period from being switched to said first state by a last one of said transitions.

8. The system of claim 7 wherein said retriggerable circuit has a time constant corresponding to said predetermined time period which is selected to be greater than the time between successively occurring transitions.

9. The system of claim 8 wherein said retriggerable circuit is adapted to switch to said first state only in response to a leading edge of each of said transitions.

10. A strobe generator for generating a strobe signal indicating a period of time to a utilization device when valid keyboard generated information may be sampled, said strobe generator comprising:

sensing means for generating a first signal in response to said keyboard generated information, said sensing means further including means for generating a second signal in response to multiple key depressions;

threshold switching means coupled to said means and being switched in response to said second signal to produce an output signal indicative of a multiple key depression;

bounce eliminator means coupled to said sensing means and to said threshold switching means, said bounce eliminator means in response to said first signal and said output signal being operative to produce a bounce free output waveform; and, strobe logic gating means coupled to said bounce eliminator means and to said sensing means, said strobe logic gating means being operative in response to said bounce free output waveform and said first signal to produce said strobe signal so as to define said period of time when said keyboard generated information can be sampled without being affected by contact bounce produced by either key depression or key release, said strobe logic gating means being coupled to said threshold switching means and being operative in response to said output signal to inhibit producing said strobe signal during said multiple key depression.

11. The generator of claim 10 further including delay logic amplifier means including first and second inputs coupled to said switching means and to said sensing means respectively and an output coupled to said strobe logic gating means, said delay means being operative to delay said output signals so they are in time coincidence with said bounce free output waveform applied to said strobe gating means.

12. The generator of claim 11 wherein said switching means includes a Schmitt circuit in series with a logic amplifier circuit which in response to said second signal generates a logic level as said output signal indicating a multiple key depression.

13. In a keyboard system including a strobe generator for generating a strobe signal indicating when valid information generated from selecting one or more keys may be sampled and for resetting functions set by previous key selections, said strobe generator comprising:

first means for generating a first signal in response to each of said key selections, said first means includes means for generating a bilevel second signal concurrent with said first signal in response to a multiple key selection;
second means coupled to said first means and being operative to produce a bounce free output signal in response to said first signal;
third means coupled to said first and second means, said third means bieng operative to combine logically said first signal and said output signal so as to produce said strobe signal in accordance with said key selection;
means coupled to said first means and to said third means, said means being operative in response to one level of said second bilevel signal to condition and third means to produce said strobe signal during the absence of said multiple key selection; and,
means coupling said last mentioned means to said second means so as to provide said bounce free output signal notwithstanding transitions produced by said multiple key selection.

14. A strobe generator for generating a strobe signal indicating a period to a utilization device when valid keyboard generated information may be sampled, said strobe generator comprising:
sensing means for generating a first signal in response to said keyboard generated information;
bounce eliminator means coupled to said sensing means, said bounce eliminator means being arranged to produce an output signal in response to said first signal only after said key depression bounce subsides and which terminates upon key release;
strobe logic gating means coupled to said bounce eliminator means and to said sensing means, said gating means being responsive to said first signal and to said output signal to produce said strobe signal which defines a period of time when said keyboard generated information can be sampled without said information being affected by contact bounce produced by key depression and key release;
said sensing means further including means for generating during said first signal, a second signal in response to multiple key depressions; and,
threshold switching means coupled to said sensing means and to said strobe logic means, said threshold switching means being switched in response to said second signal to produce an output signal for inhibiting said strobe logic means from producing said strobe signal during the interval defined by said second signal.

15. In a keyboard system including a strobe generator for generating a strobe signal indicating when valid information generated from selecting one or more keys may be sampled and for resetting functions set by previous key selections, said strobe generator comprising:
first means for generating a first signal in response to each of said key selections;
second means coupled to said first means and being operative to produce a bounce free output signal in response to said first signal only after key depression bounce subsides and which terminates upon key release;
third means coupled to said first and second means, said third means being operative to combine logically said first signal and said output signal so as to produce said strobe signal in accordance with said key selection;
said first means including means for generating a bilevel second signal concurrent with said first signal in response to a multiple key selection; and,
means coupled to said first means and to said third means, said last named means in response to one level of said second bilevel signal being operative to condition said third means to inhibit said strobe signal only during said multiple key selection.

16. The system of claim 15 wherein said third means includes AND gating means and said last named means includes a threshold switching circuit, said circuit being responsive to said one level to apply a binary output signal to said third means for conditioning said AND gating means to produce said strobe output signal only during a single key depression.

17. The system of claim 15 wherein said first means includes an emitter follower OR gate means, including at least first and second input terminals and first and second output terminals for producing said first and second signals respectively; and, diode means for individually connecting each of said keys to said first and second input terminals so that the depression of more than one key simultaneously conditions said OR gating means to produce said one level of said second signal indicative of said multiple key selection.

18. In a keyboard system including a strobe generator for generating a strobe signal indicating when valid information generated from selecting one or moer keys may be sampled and for resetting functions set by previous key selections, said strobe generator comprising:
first means for generating a first signal in response to each of said key selections;
second means coupled to said first means and being operative to produce a bounce free output signal in response to said first signal only after key depression bounce subsides and which terminates upon key release;
third means coupled to said first and second means, said third means being operative to combine logically said first signal and said output signal so as to produce said strobe signal in accordance with said key selection; and,
said system having at least one of said keys used to signal a control operation, said system further including logic means responsive to the selection of said one key and to a trailing edge of said strobe signal to generate an output signal for conditioning said system for said control operation and said logic means being responsive to said trailing edge of a strobe signal produced by a subsequent key selection to terminate said control operation whereby said system is restored to its original status.

19. The system of claim 18 wherein said control operation is a repeat function.

* * * * *

UNITED STATES PATENT OFFICE
CERTIFICATE OF CORRECTION

Patent No. 3,753,007 Dated August 14, 1973

Inventor(s) G. R. Viswanathan

It is certified that error appears in the above-identified patent and that said Letters Patent are hereby corrected as shown below:

Column 10, line 26, delete "an" and insert --a--.

Column 10, line 27, "a", second occurrence should read -- an -

Column 13, line 7, delete "bieng" and insert --being--.

Column 13, line 14, delete "and" and insert --said--.

Column 14, line 33, delete "moer" and insert --more--.

Signed and sealed this 6th day of August 1974.

(SEAL)
Attest:

McCOY M. GIBSON, JR.
Attesting Officer

C. MARSHALL DANN
Commissioner of Patents